(12) United States Patent
Song et al.

(10) Patent No.: US 8,942,521 B2
(45) Date of Patent: Jan. 27, 2015

(54) PLANAR WAVEGUIDE ELEMENT

(71) Applicant: Electronics and Telecommunications Research Institute, Daejeon (KR)

(72) Inventors: Jung-Ho Song, Daejeon (KR); Hong-Seok Seo, Daejeon (KR); Won Seok Han, Daejeon (KR); Bong Je Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 186 days.

(21) Appl. No.: 13/759,690

(22) Filed: Feb. 5, 2013

(65) Prior Publication Data

US 2013/0287339 A1   Oct. 31, 2013

(30) Foreign Application Priority Data

Apr. 27, 2012   (KR) .................. 10-2012-0044349

(51) Int. Cl.
 G02B 6/12   (2006.01)
 G02B 6/32   (2006.01)
 G02B 27/10  (2006.01)
 G02B 6/28   (2006.01)
 G02B 6/26   (2006.01)
 G02B 6/42   (2006.01)

(52) U.S. Cl.
 CPC ....................... *G02B 6/32* (2013.01)
 USPC ............... 385/14; 385/24; 385/33; 385/34; 385/43; 385/50; 385/129; 359/619

(58) Field of Classification Search
 USPC ............... 385/14, 24, 27, 33–34, 43, 50, 129; 359/618, 619; 398/9
 See application file for complete search history.

(56) References Cited

U.S. PATENT DOCUMENTS

| 6,330,089 B1 * | 12/2001 | Yamada ....................... 398/9 |
| 6,384,981 B1 | 5/2002 | Hauschild |
| 6,462,883 B1 | 10/2002 | Wang et al. |
| 7,848,372 B2 | 12/2010 | Schulte et al. |

FOREIGN PATENT DOCUMENTS

| JP | 2000-180762 A | 6/2000 |
| JP | 2011-141943 A | 7/2011 |

OTHER PUBLICATIONS

Yu-Long Tang et al., "Beam collimation of high-power laser diode array with graded-index fiber lens array", Optical Engineering, May 2008, pp. 054202-1-054202-4, vol. 47, No. 5.
Udo Fornahl et al., "High efficient fiber coupling of laser diode bars with >50% electro-optical efficiency out of the fiber core", Proceedings of SPIE, Feb. 13, 2008, pp. 68760X-1-68760X-10, vol. 6876, No. 68760X.

* cited by examiner

*Primary Examiner* — Akm Enayet Ullah
*Assistant Examiner* — Michael Mooney
(74) *Attorney, Agent, or Firm* — Rabin & Berdo, P.C.

(57) ABSTRACT

Disclosed is a planar waveguide element including a first cylindrical lens disposed based on an z-axis and configured to collimate beams emitted from a plurality of emitters of a laser diode bar; a lens array configured to gather the beam emitted from each emitter via the first cylindrical lens; a plurality of first waveguides existing on an x-y plane by a number of the plurality of emitters and configured to gather at one place via a bending section; a taper configured to connect the lens array and each first waveguide, a width of the taper being narrower from the lens array to the plurality of first waveguide; and a combined waveguide configured to combine the plurality of first waveguides into one.

11 Claims, 6 Drawing Sheets

< PRIOR ART >

< PRIOR ART >

(A) Fast Axis (B) Slow Axis

PLANAR WAVEGUIDE ELEMENT

CROSS-REFERENCE TO RELATED APPLICATIONS

This application is based on and claims priority from Korean Patent Application No. 10-2012-0044349, filed on Apr. 27, 2012, with the Korean Intellectual Property Office, the disclosure of which is incorporated herein in its entirety by reference.

TECHNICAL FIELD

The present disclosure relates to a planar waveguide element for efficiently gathering beams emitted from a laser diode bar and combining the gathered beams with an optical fiber.

BACKGROUND

A laser diode bar refers to a semiconductor light resource in which emitters corresponding to diode lasers are arranged on one-dimensional array, and frequently used as a pumping light resource of a solid state laser or an optical fiber laser.

FIG. 1 illustrates types of beams emitted from a laser diode bar.

Referring to FIG. 1, a radiation angle 112 perpendicular to an emitter 100, that is, with respect to a fast axis is very large ranging from 30 to 40 degrees, but a radiation angle 114 parallel to the emitter 100, that is, with respect to a slow axis is very small ranging from 6 to 10 degrees. Here, in order to collimate a fast axis beam having a large radiation angle, a cylindrical lens having a high numerical aperture (hereinafter, referred to as an "NA") should be used. When a width 122 of a single emitter is narrower, beam quality is more improved, and when an interval 124 between emitters is wider, heat is more easily emitted. Accordingly, a space may exist where light is not emitted between the emitters, thereby deteriorating the beam quality.

In U.S. Pat. No. 6,384,981 entitled "Optical emitter array with collimating optics unit", D. Hauschild proposes a method of removing an empty space between emitters and increasing an optical fill factor by enlarging a width of the emitter by an interval between the emitters with the use of two micro-optic cylindrical lens arrays.

In the paper entitled "Beam collimation of high-power laser diode array with graded-index fiber lens array", Optical Engineering 47(5), 054202, 2008, Y. Tang et al. describes a method of making beams of respective emitters symmetrical to each other by using a graded-index fiber lens array as a slow axis collimator and collimating the beams. The collimated beams may be combined with a multi-mode optical fiber. Such a method has advantages corresponding to low costs and high yields, but has disadvantages in that the method cannot be used for an emitter interval narrower than a diameter of a graded-index optical fiber and beam quality is deteriorated.

Optical power of the laser diode bar is frequently used in combination with the optical fiber in order to be used for pumping the optical fiber laser or use circular beam quality and manageable characteristics of the optical fiber. In this case, asymmetrical beam quality between the fast axis and the slow axis of the laser diode bar is the problem. Beam quality of the light source is indicated by a beam parameter product (BPP), and expressed by a multiple of a beam waist corresponding to a beam size and a radiation angle. In a single emitter having a width of 100 μm, while the BPP of the fast axis is 0.3 mm*mrad, the BPP of the slow axis is 5 mm*mrad.

The BPP of a representative input optical fiber for combination with the optical fiber having a core diameter of 105 μm and an NA of 0.15 is 8 mm*mrad.

FIG. 2 illustrates types of beams of the optical fiber.

When a long rectangular beam 210 of the single emitter is received using the optical fiber, many empty spaces are generated in a fast axis direction as illustrated in FIG. 2A. The above problem may be solved by using a heat sink in a step structure proposed in U.S. Pat. No. 7,848,372 entitled "Modular Laser Assembly" by D. Schulte. When single emitters are disposed on steps having slightly different heights in the fast axis direction, a sum of beams of the single emitters has a square shape as illustrated in FIG. 2B, thereby increasing an optical fill factor of the optical fiber. However, such a method has disadvantages in that it requires a very complex processing when the heat sink in the step structure is manufactured and cooling water cannot be directly flowed to the heat sink.

In the general laser diode bar, the BPP in the slow axis is equal to or larger than 200 mm*mrad even though the optical fill factor is increased by performing collimation in the slow axis. Since the BPP cannot be reduced in an optical system, a core diameter or an NA is larger than an optical fiber having a core diameter of 105 μm and an NA of 0.15 in order to receive all beams of the slow axis of a the single emitter, so that an optical fiber having a large BPP should be used. In U.S. Pat. No. 6,462,883 entitled "Optical Coupling Systems", Z. Wang et al. proposes a method of re-arranging beams emitted from respective emitters on the fast axis by a laser diode bar. That is, by giving some angles to an axis of a cylindrical lens collimated in the fast axis direction with respect to an axis of the emitter, a slow axis beam of the LD bar has a different position in the fast axis direction. Further, beams divided using the optical system are imaged and arranged on the fast axis. In this case, the beams face different directions, and may move to an equal direction by using several mirrors and prisms. With the use of such a method, a beam having a rectangular shape with long side in a direction of the slow axis is divided into smaller beams, the divided beams are arranged on the fast axis, and a sum of the beams becomes a square shape, thereby increasing efficiency of combination with a circular optical fiber. However, the method has to use several optical components and requires a precise arrangement thereof.

SUMMARY

The present disclosure has been made in an effort to provide a planar waveguide element which efficiently collimates and combines optical power of a laser diode bar while reducing the number of used components and decreasing manufacturing and assembling costs of the components required for a delicate arrangement.

Further, the present disclosure has been made in an effort to provide a planar waveguide element which may combine maximum optical power with an optical fiber having a small core diameter and a low NA while not deteriorating quality of an optical power beam of a laser diode bar.

An exemplary embodiment of the present disclosure provides a planar waveguide element for gathering beams of a laser diode bar at a waveguide by using a cylindrical lens and combining and distributing the gathered beams by combining and branching the waveguide to easily optically combine the beams with an optical fiber.

An exemplary embodiment of the present disclosure provides a planar waveguide element including: a first cylindrical lens disposed based on an z-axis and configured to collimate beams emitted from a plurality of emitters of a laser diode bar; a lens array configured to gather the beam emitted from each emitter via the first cylindrical lens; a plurality of first waveguides existing on an x-y plane by a number of the plurality of emitters and configured to gather at one place via a bending section; a taper configured to connect the lens array and each first waveguide, a width of the taper being narrower from the lens array to the plurality of first waveguide; and a combined waveguide configured to combine the plurality of first waveguides into one.

Another exemplary embodiment of the present disclosure provides a planar waveguide element including: a first cylindrical lens disposed based on an z-axis and configured to collimate beams emitted from a plurality of emitters of a laser diode bar; a lens array configured to gather the beam emitted from each emitter via the first cylindrical lens; a plurality of first waveguides existing on an x-y plane by a number of the plurality of emitters and configured to have ends arranged on a straight line via a bending section and having regular intervals therebetween; a trench formed on the end of each second waveguide; and a mirror mounted to the trench while having an angle of 45 degrees with respect to a direction of a beam emitted from each second waveguide.

According to the exemplary embodiments of the present disclosure, it is possible to manufacture a planar waveguide element by using a lithography technology having a very high precision by providing a wafer based planar waveguide element, and it is not required to perform arrangement operations related to an angle such as "pitch, yaw, and roll" generated when an individual optical system such as a micro-optic and the like is used since optical combination and distribution are performed in a plane.

According to the exemplary embodiments of the present disclosure, it is possible to easily arrange cylindrical lenses and reflecting mirrors by providing guiding structures for the cylindrical lenses and the mirrors used for collimation on the fast axis, by using a lithography process, and to remove a loss due to the combination of beams and the waveguide in the fast axis when there is no change in a width of a core.

According to the exemplary embodiments of the present disclosure, it is possible to easily change designs and characteristics of a laser diode bar by providing a planar waveguide element where the number of branch waveguides, a width and a thickness of the waveguide, a type of lens of a slow axis, and an arrangement of an output terminal of a waveguide structure may be easily changed.

According to the exemplary embodiments of the present disclosure, it is possible to reduce numbers of components and precise assembly operations and easily change designs of a laser diode bar by providing a planar waveguide element which may efficiently combine beams emitted from the laser diode bar with an optical fiber.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 3:
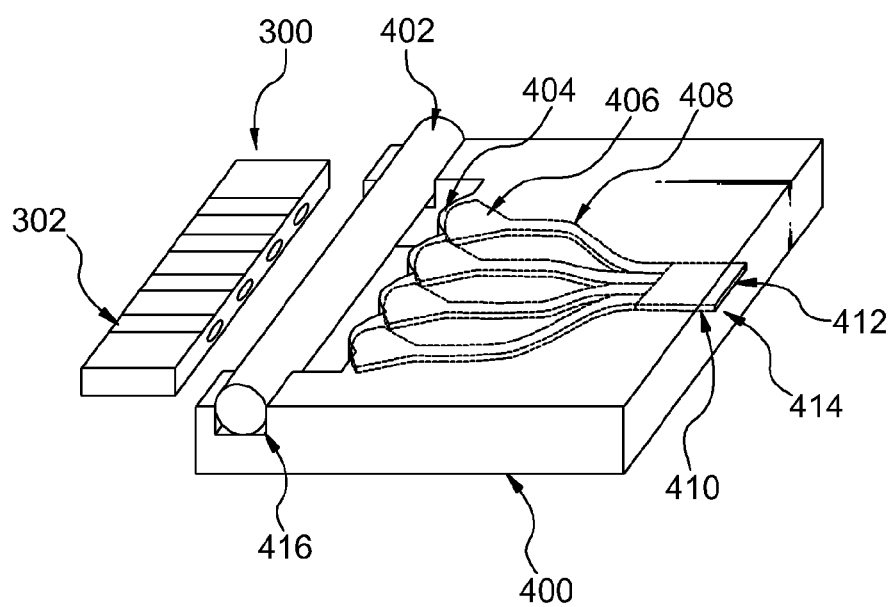
FIG. 3 illustrates a configuration of a planar waveguide element for optical combination with a laser diode bar according to an exemplary embodiment of the present disclosure.
Figure 4:
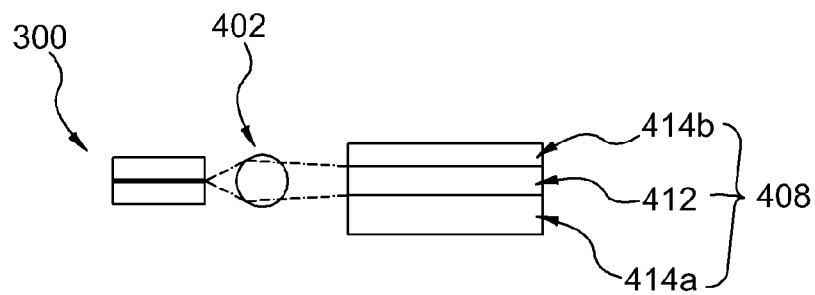
FIG. 4 illustrates a configuration of a planar waveguide element for optical combination with a laser diode bar according to an exemplary embodiment of the present disclosure viewed from a fast axis and a slow axis.
Figure 4:
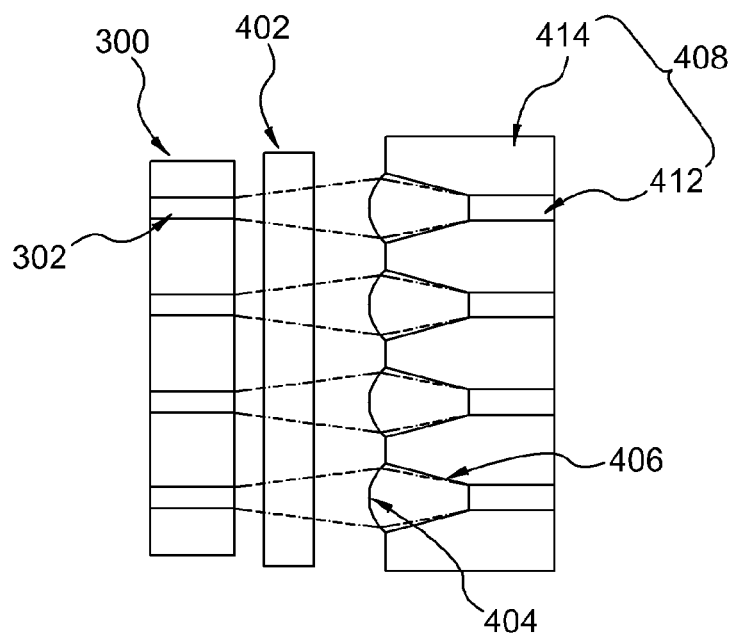

FIG. 3 illustrates a configuration of a planar waveguide element for optical combination with a laser diode bar according to an exemplary embodiment of the present disclosure, and FIG. 4 illustrates a configuration of a planar waveguide element for optical combination with a laser diode bar according to an exemplary embodiment of the present disclosure viewed from a fast axis and a slow axis.

Referring to FIG. 3, collimation of a fast axis is performed by a first cylindrical lens 402, and collimation of a slow axis and beam combination are performed by a planar waveguide element 400. Here, the planar waveguide element 400 largely includes a material 412 having a refractive index of n1 corresponding to a core and a material 414 having a refractive index of n2 corresponding to a cladding. For example, Silica ($SiO_2$) is used for cladding and germanium-doped silica is used for the core. In this case, numerical apertures (hereinafter, referred to as "NAs") of the planar waveguide element 400 are $(n_1^2 - n_2^2)^{1/2}$.

As illustrated in FIG. 4A, beams of a laser diode bar 300 are collimated by the first cylindrical lens 402 and combined with a first waveguide 408 when the planar waveguide element 400 according to the present disclosure is viewed from an aspect of the fast axis. Here, due to a smile phenomenon where a plurality of emitters 302 are not located on a straight line, a beam parameter product (BPP) of the fast axis of the laser diode bar 300 may be larger than that in a case where the laser diode bar 300 is configured by a single emitter. When a thickness of the core 412 is controlled to allow the BPP to have a larger value, optical combination efficiency may be improved and beam quality having excellent characteristics may be maintained. That is, the waveguide having the NA of 0.15 requires the core having a width of about 15 μm to have the BPP of 1 mm*mrad.

The planar waveguide element 400 has an advantage of excellently maintaining the BPP of the fast axis even during the process of controlling the combination, division and the like of beams of the slow axis.

When light of the laser diode bar 300 is combined by using an optical fiber array in the planar waveguide element in the prior art, there is a disadvantage in that the BPP of the fast axis becomes large because of the large BPP of the slow axis. Further, when micro-optics is used, the BPP of the fast axis may be increased due to an arrangement error and the like.

However, in the planar waveguide element 400 according to the present disclosure, the light combined with the first waveguide 408 may maintain characteristics thereof while passing along the first waveguide 408.

As illustrated in FIG. 4B, a beam emitted from each emitter 302 is gathered by the lens array 404 and combined with the first waveguide 408 through a taper 406 when the planar waveguide element 400 according to the present disclosure is viewed from an aspect of the slow axis. Here, combination efficiency is improved and beam quality is maintained by making the width of the first waveguide 408 slightly larger than the BPP of the slow axis of the single emitter 302 or equal to the BPP of the slow axis of the single emitter 302. For example, when the BPP of the single emitter 302 corresponding to 100 µm is 5 mm*mrad, the width of the first waveguide 408 having the NA of 0.15 corresponding to the BPP of 100 µm is approximately 70 µm. In this case, it is preferable to remove an optical loss by making an angle of the taper 406 small in proportion to the NA of the first waveguide 408.

Further, the first waveguide 408, which receives the beam from each emitter 302 joins at a combined waveguide 410 via a bending section. Here, it is preferable to reduce or minimize the optical loss by making a bending radius of the bending section sufficiently large. Further, a width of the combined waveguide 410 is equal to a sum of widths of the respective first waveguide 408, and similarly, the BPP of the slow axis is equal to a sum of BPPs of the respective first waveguide 408. Accordingly, it is possible to obtain a beam having a high optical fill factor at an end of the combined waveguide 410 without a gap caused by an interval between emitters 302. In this case, the beam may be easily used by outputting the beam having an equal low radiation angle (NA) in both directions of the slow axis and the fast axis while beam quality is scarcely affected.

Meanwhile, the planar waveguide element 400 according to the present disclosure may be manufactured by the following method.

The germanium (Ge)-doped core 412 is deposited on a silica (SiO$_2$) substrate corresponding to a lower cladding 414a, a pattern is formed by using lithography, and then the core 412 is partially etched. Thereafter, a groove 416 for mounting the lens array 404 of the slow axis and the first cylindrical lens 402 is formed by depositing an upper cladding 414b and then forming the pattern once again and performing the etching. Lastly, the first cylindrical lens 402 is inserted into the groove 416 to complete the planar waveguide element 400.

Figure 5:
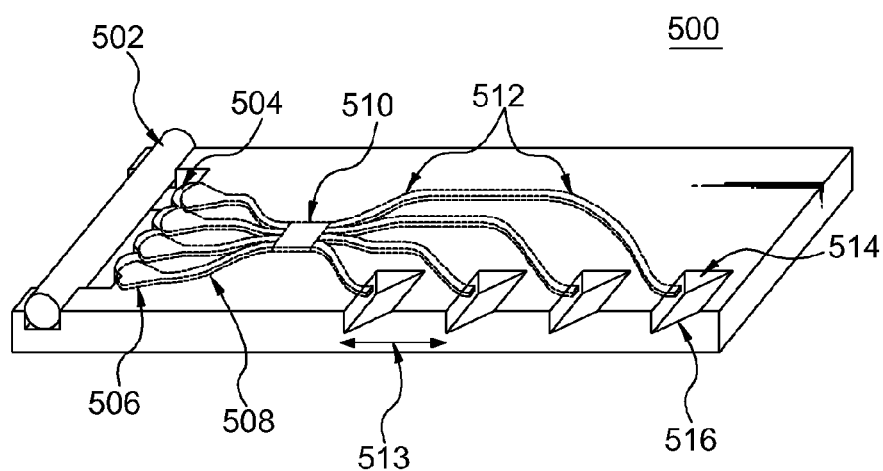
FIG. 5 illustrates a configuration of a planar waveguide element according to another exemplary embodiment of the present disclosure.
Figure 6:
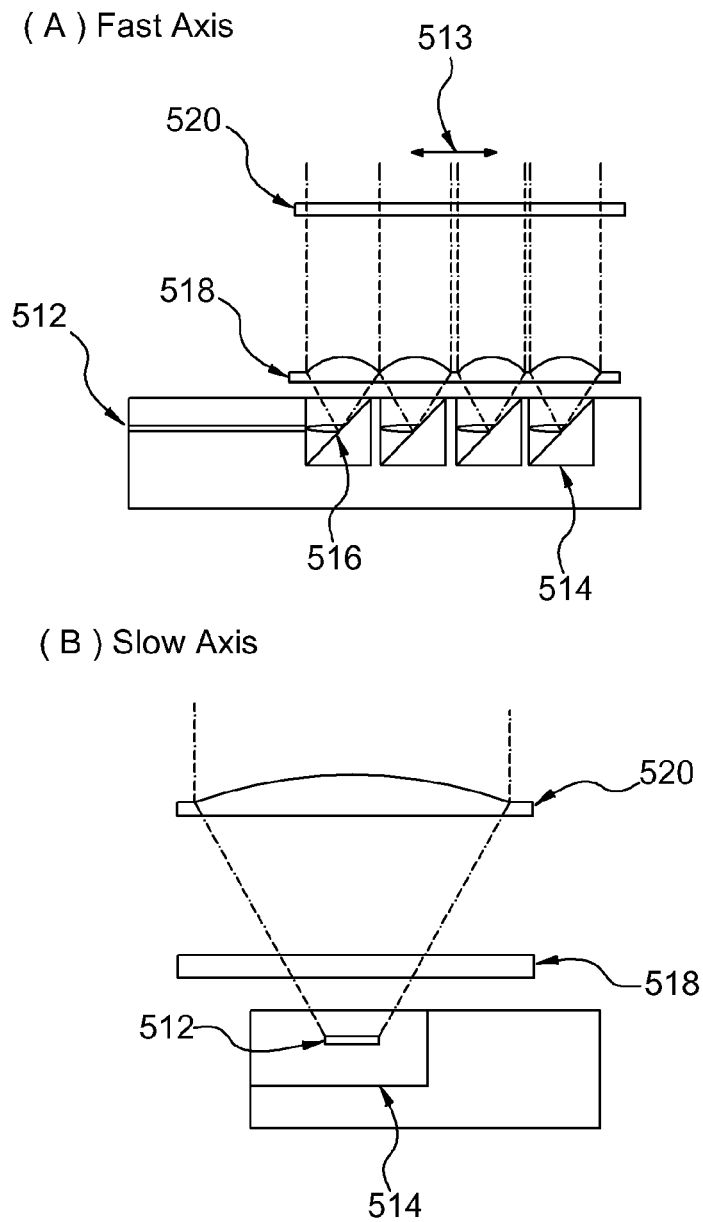
FIG. 6 illustrates a configuration of a planar waveguide element according to another exemplary embodiment of the present disclosure viewed from a fast axis and a slow axis.

FIG. 5 illustrates a configuration of a planar waveguide element according to another exemplary embodiment of the present disclosure, and FIG. 6 illustrates a configuration of a planar waveguide element according to another exemplary embodiment of the present disclosure viewed from the fast axis and the slow axis.

Referring to FIG. 5, since component such as a first cylindrical lens 502, a lens array 504, a taper 506, a first waveguide 508, and a combined waveguide 510 in a planar waveguide element 500 according to another exemplary embodiment of the present disclosure are equal to those in the planar waveguide element 400 of FIG. 3, detailed descriptions thereof will be omitted.

However, the combined waveguide 510 in the planar waveguide element 500 according to another exemplary embodiment of the present disclosure branches into a plurality of second waveguides 512. The second waveguides 512 pass through a bending section and ends thereof are arranged on a straight line, and intervals 513 between the second waveguides 512 are consistent. Here, widths and numbers of the second waveguides 512 do not need to be equal to those of the first waveguides 508 connecting the lens array 504 and the combined waveguide 510. When the widths and numbers of the second waveguides 512 are equal to those of the first waveguides 508 connecting the lens array 504 and the combined waveguide 510, each waveguide may be directly connected from a taper 506 to a trench 514 without the combined waveguide 510.

Further, the end of the second waveguide 512 is defined by the trench 514, and a mirror 516 having an angle of 45 degrees with respect to a direction of the beam emitted from the second waveguide 512 is mounted to the trench 514.

As illustrated in FIG. 6A, beams emitted from the ends of the second waveguides 512 are reflected from the mirrors 516 and progress in a direction perpendicular to the substrate when the planar waveguide 500 according to the present disclosure is viewed from an aspect of the fast axis. Further, since the ends of the second waveguides 512 are arranged at regular intervals 513, beams of the fast axis are emitted in parallel at regular intervals 513. In addition, respective beams are collimated by using a cylindrical lens array 518, and thus have regular sizes.

Figure 1:
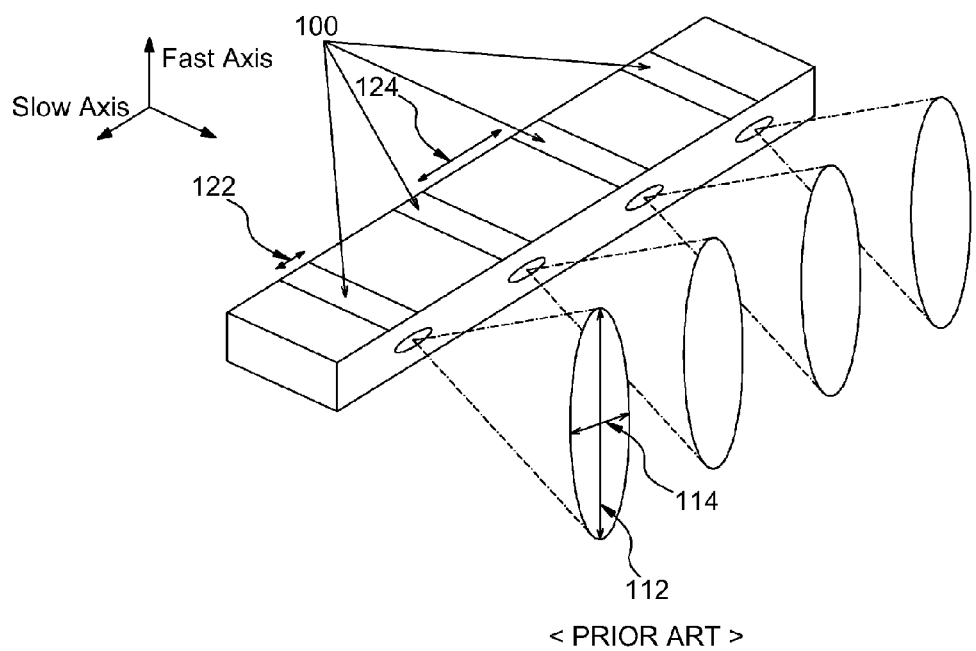
FIG. 1 illustrates types of beams emitted from a laser diode bar.
Figure 2:
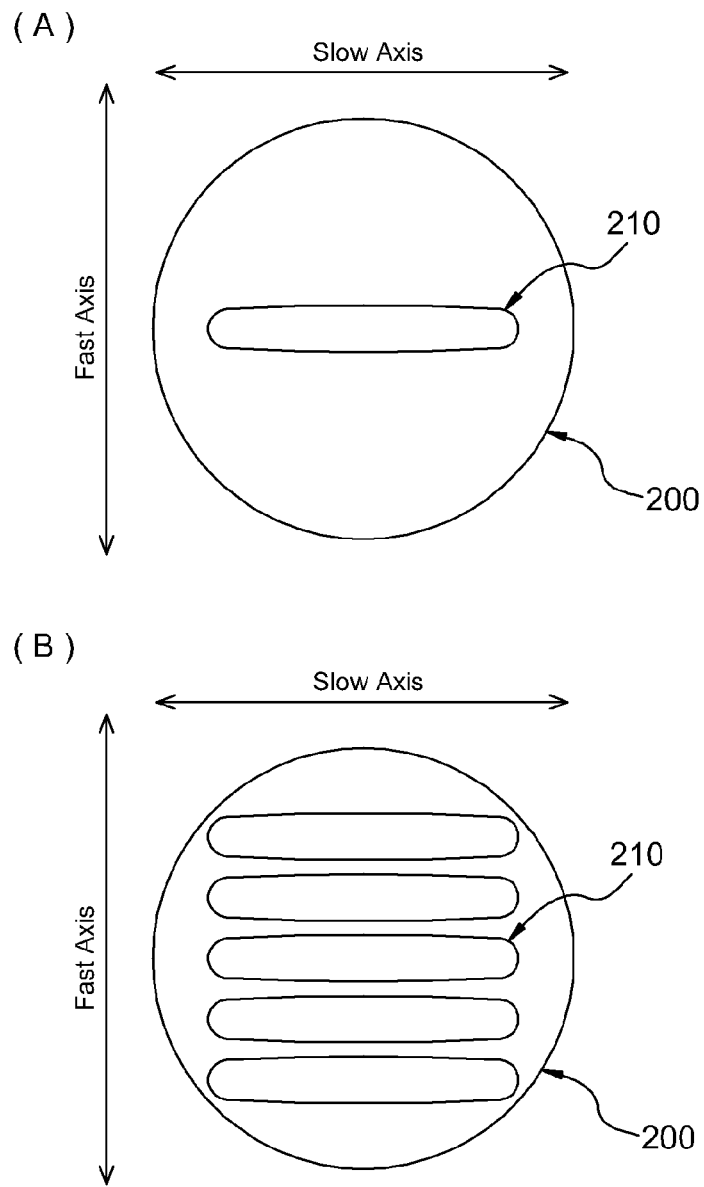
FIG. 2 illustrates types of beams of an optical fiber.

As illustrated in FIG. 6B, a collimated beam having a size equal to a sum of sizes of beams collimated in the fast axis is made by using a second cylindrical lens 520 when the planar waveguide element 500 according to the present disclosure is viewed from an aspect of the slow axis. Through such a method, it is possible to make the beam having the square shape as shown in FIG. 2B, thereby increasing efficiency of the combining with the circular optical fiber.

Meanwhile, by considering a fact that the BPP cannot be reduced in the optical system, the number of waveguides corresponding to a value generated by dividing the BPP of the slow axis of the waveguide by the BPP of the fast axis may be used and the beam having the square shape may be obtained, so that the optical fill factor may be increased in the circular optical fiber coupling. For example, when an output waveguide having the NA of 0.15, the width of 70 µm, and the thickness of 15 µm is used, the BPP of the slow axis is 5 mm*mrad and the BPP of the fast axis is 1 mm*mrad. Accordingly, when five waveguides overlap in a direction of the fast axis, the beam having the square shape of which one side is 5 mm*mrad may be obtained. In this case, a diagonal line of the beam having the square shape is approximately 7 mm*mrad, which is similar to the BPP (8 mm*mrad) of the optical fiber having the core diameter of 105 µm and the NA of 0.15, thereby increasing the optical fill factor.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A planar waveguide element comprising:
   a first cylindrical lens disposed based on an z-axis and configured to collimate beams emitted from a plurality of emitters of a laser diode bar;
   a lens array configured to gather the beam emitted from each emitter via the first cylindrical lens;
   a plurality of first waveguides existing on an x-y plane by a number of the plurality of emitters and configured to gather at one place via a bending section;

a taper configured to connect the lens array and each first waveguide, a width of the taper being narrower from the lens array to the plurality of first waveguides; and a combined waveguide configured to combine the plurality of first waveguides into one.

2. The planar waveguide element of claim 1, wherein the width of the first waveguide is wider than or equal to a beam parameter product (BPP) of a slow axis of the emitter.

3. The planar waveguide element of claim 1, wherein an angle of the taper is small in proportion to numerical apertures of the first waveguide.

4. The planar waveguide element of claim 1, wherein a width of the combined waveguide is equal to a sum of widths of the plurality of first waveguides.

5. The planar waveguide element of claim 1, a beam parameter product (BPP) of a slow axis of the combined waveguide is equal to a sum of BPPs of a slow axis of the plurality of first waveguides.

6. The planar waveguide element of claim 1, further comprising:

a plurality of second waveguides configured to branch from the combined waveguide to pass through the bending section, ends of the plurality of second waveguides being arranged on a straight line and having regular intervals;

a trench formed on the end of each second waveguide; and a mirror mounted to the trench while having an angle of 45 degrees with respect to a direction of a beam emitted from each second waveguide.

7. The planar waveguide element of claim 6, further comprising:

a cylindrical lens array configured to collimate beams reflected from the mirror to make the collimated beams have regular sizes in the fast axis; and a second cylindrical lens configured to add the beams collimated by the cylindrical lens array to make a beam having a size equal to a sum of the beams of the fast axis.

8. A planar waveguide element comprising:

a first cylindrical lens disposed based on an z-axis and configured to collimate beams emitted from a plurality of emitters of a laser diode bar;

a lens array configured to gather the beam emitted from each emitter via the first cylindrical lens;

a plurality of first waveguides existing on an x-y plane by a number of the plurality of emitters and configured to have ends arranged on a straight line via a bending section and having regular intervals therebetween;

a trench formed on the end of each second waveguide; and a mirror mounted to the trench while having an angle of 45 degrees with respect to a direction of a beam emitted from each second waveguide.

9. The planar waveguide element of claim 8, further comprising:

a cylindrical lens array configured to collimate beams reflected from the mirror to make the collimated beams have regular sizes in a fast axis; and a second cylindrical lens configured to add the beams collimated by the cylindrical lens array to make a beam having a size equal to a sum of the beams of the fast axis.

10. The planar waveguide element of claim 8, wherein the width of the first waveguide is wider than or equal to a beam parameter product (BPP) of a slow axis of the emitter.

11. The planar waveguide element of claim 8, wherein an angle of the taper is small in proportion to numerical apertures of the first waveguide.

* * * * *